US006747806B2

(12) United States Patent
Gelbart

(10) Patent No.: US 6,747,806 B2
(45) Date of Patent: Jun. 8, 2004

(54) METHOD FOR CONTROLLING LIGHT BEAM USING ADAPTIVE MICRO-LENS

(75) Inventor: Daniel Gelbart, Vancouver (CA)

(73) Assignee: Creo Srl, Burnaby (CA)

( * ) Notice: Subject to any disclaimer, the term of this patent is extended or adjusted under 35 U.S.C. 154(b) by 262 days.

(21) Appl. No.: 09/837,433

(22) Filed: Apr. 19, 2001

(65) Prior Publication Data

US 2002/0154380 A1 Oct. 24, 2002

(51) Int. Cl.[7] .................................................. G02B 1/06
(52) U.S. Cl. ....................................... 359/666; 359/665
(58) Field of Search ............................... 359/665–667, 359/245, 244, 288, 279, 316, 254; 349/202, 193, 315, 209, 25, 30, 201

(56) References Cited

U.S. PATENT DOCUMENTS

| | | |
|---|---|---|
| 2,896,507 A | 7/1959 | Mast et al. |
| 3,309,162 A | 3/1967 | Kosanke et al. |
| 3,424,513 A | 1/1969 | Lotspeich et al. |
| 4,037,929 A | 7/1977 | Bricot et al. |
| 4,289,379 A | 9/1981 | Michelet |
| 5,541,776 A * | 7/1996 | Kobayashi et al. ......... 359/665 |
| 5,574,598 A * | 11/1996 | Koumura et al. ........... 359/666 |
| 5,636,052 A * | 6/1997 | Arney et al. ............... 359/291 |
| 5,710,656 A * | 1/1998 | Goossen ..................... 359/291 |
| 5,825,528 A * | 10/1998 | Goossen ..................... 359/291 |
| 6,181,485 B1 * | 1/2001 | He ............................. 359/665 |
| 2003/0007236 A1 * | 1/2003 | Schachar et al. ........... 359/290 |

FOREIGN PATENT DOCUMENTS

JP          11133210 A          5/1999

OTHER PUBLICATIONS

Bifano, Thomas G., et al. 1997. "Continuous–membrane surface–micromachined silicon deformable mirror." Optical Engineering, vol. 36 (5), 1354–1360.

Edwards, J.C. "Variable curvature fluid lens." IBM Technical Disclosure Bulletin, Jun. 1981, pp. 572–573. <accessed Apr. 18, 2001, via the World Wide Web, through http://www.delphion.com/tdbs/list>.

* cited by examiner

Primary Examiner—Georgia Epps
Assistant Examiner—M. Hasan
(74) Attorney, Agent, or Firm—Oyen Wiggs Green & Mutala

(57) ABSTRACT

Individual elements in a micro-electromechanical array of integrated stretched membrane devices are independently addressed and controlled to produce independently controlled degrees of refraction of light beams.

63 Claims, 4 Drawing Sheets

METHOD FOR CONTROLLING LIGHT BEAM USING ADAPTIVE MICRO-LENS

CROSS-REFERENCE TO RELATED APPLICATIONS

This application is related to co-pending, co-owned U.S. patent application Ser. No. 09/813,839, entitled "Method for linearization of an actuator via force gradient modification", filed Mar. 22, 2001.

Not applicable

REFERENCE TO MICROFICHE APPENDIX

Not applicable

FIELD OF THE INVENTION

The invention pertains to optical communications and in particular to the control of optical beams using adaptive optical elements.

BACKGROUND OF THE INVENTION

The field of communications has benefited enormously from the introduction of optical communications technology. Fundamentally, this technology exploits the inherent bandwidth potential of the light itself as a carrier for communications signals. As this technology matures, the need for the direct optical processing of the signals is becoming greater. Much of the communications infrastructure in operation in the field today relies on signals being converted from optical form back to electrical form for much of the signal processing and management. Direct optical processing has the benefit of avoiding the need for optical to electrical and electrical to optical conversion equipment with its associated costs, losses, and amplification requirements.

One of the critical issues within the field of optical communications relates to the situation where many optical signal channels on parallel fibers have to be controlled, adjusted, or switched at a single point in the communication system. This issue creates a corresponding need for a microelectronic device with a considerable level of device integration and individually adjustable channels. Simultaneously there is a clear need for devices that will perform these functions while being rapidly adjustable in operation. It is also desirable for candidate devices to have relatively low insertion losses and a minimum possible wavelength dependence.

One of the fundamental building blocks of an optical communications system is the optical cross-connect or optical crossbar switch. Optical crossbar switches function to selectably connect any one of an array of incoming optical signals to any one of an array of outgoing channels. Inherently these devices consist of a multiplicity of optical communications channels which may be implemented on a semiconductor wafer using micro-machining technology.

A variety of specific individual device structures have been proposed and fabricated to address the above-described application. Many of these devices rely on non-linear Optic materials to obtain switching actions. Another popular way to address the above described application is by means of micro-electromechanical structures. These micro-electromechanical structures are usually micro-mirror devices that tilt, flex, or flip upon application of an appropriate control voltage.

Most typically, these devices have two states, one of which causes an incoming beam of light to bypass the mirror, either by flipping the mirror down or removing it from the beam path by some other means, and a second position in which the mirror is interposed in the path of the beam so as to reflect it into some or other desired direction. This is done in order to couple the optical beam into an output channel, usually via a micro-lens and optical fiber arrangement.

The small apertures involved in the light-carrying cores of the optical fibers, particularly single mode fibers, lead to considerable beam divergence. Divergence is typically addressed by using suitably small micro-lenses that seek to collimate or focus the divergent light beam emerging from the input signal optical fiber. At the output end of a crossbar switch there is a corresponding requirement for a lens to ensure appropriate coupling of the optical beam to the output optical fiber. Again, there are great constraints on the scope of the physical dimensions of these devices.

A particular problem in these arrangements is the fixed nature of the micro-lenses which restricts the latitude of design available to optical engineers. It also puts constraints on the silicon micro-machined optical switching devices that typically form the heart of these crossbar switches, in that the optical switching devices have to be fabricated such that they are optically matched to the fixed lenses in order to ensure minimum insertion losses and to restrict losses inside the devices.

These design restrictions would be reduced if suitable adaptive micro-lenses were available. Since one of the strengths of optical communications is the very wide bandwidth that it makes possible, there is every incentive to ensure that the optical devices and elements that are part of optical crossbar switches are commensurately fast, as this determines the rate at which routing and managed networking of the communication signals may be achieved. This issue applies not only to the sophisticated silicon devices in a crossbar switch, but also to any adaptive micro-lenses within such a crossbar switch.

Liquid crystal lenses to address some of these issues are known in the art. However, these devices have limited speed due to the inherently slow switching speed of the liquid crystal mechanism. Over the past decade, much collective effort was devoted to deformable macroscopic mirror devices for light projection systems, and in this respect piezoelectrically deformed lenses are known, but these clearly do not lend themselves to application in miniaturized optical crossbar switches.

Micro-electromechanical (MEMS) devices have been applied in the field of adaptive optical devices before and are attractive from the point of view of their relatively high switching speeds. However, MEMS devices are more typically employed as two state devices for binary functions, this being due to the difficulty in obtaining controlled analog deformation from the cantilever and torsion structures typically employed in these devices. Devices aimed at the controlled adaptation of light beams are therefore typically difficult to fabricate using typical prior art MEMS devices.

In general, it is preferable for an adaptive optical element to maintain its full dynamic range of adaptation, while simultaneously providing acceptable control over that range, most particularly, at the low end of the adaptation range. The concern related to the low end of the adaptation range is due to the fact that there are many optical systems in which slight adaptation of focal lengths and the like, may result in greatly disproportionate effects within the overall optical systems.

Another approach for providing adaptive optical elements involves providing a membrane that is fixed at its perimeter, or that extends over a system of holes, and then deforming one or more of these membranes using an electric field for electrostatic attraction. The typical device fabricated in this way may be used to produce beam extinction or modulation by employing very tiny deformations together with the principle of optical interference. Along with these general principles of operation, comes a general tendency of these devices to be inherently wavelength-sensitive.

BRIEF SUMMARY OF THE INVENTION

Individual elements in a micro-electromechanical array of integrated stretched membrane devices are independently addressed and controlled to produce independently controlled degrees of refraction of light beams.

DETAILED DESCRIPTION OF THE PREFERRED EMBODIMENT

Figure 1:
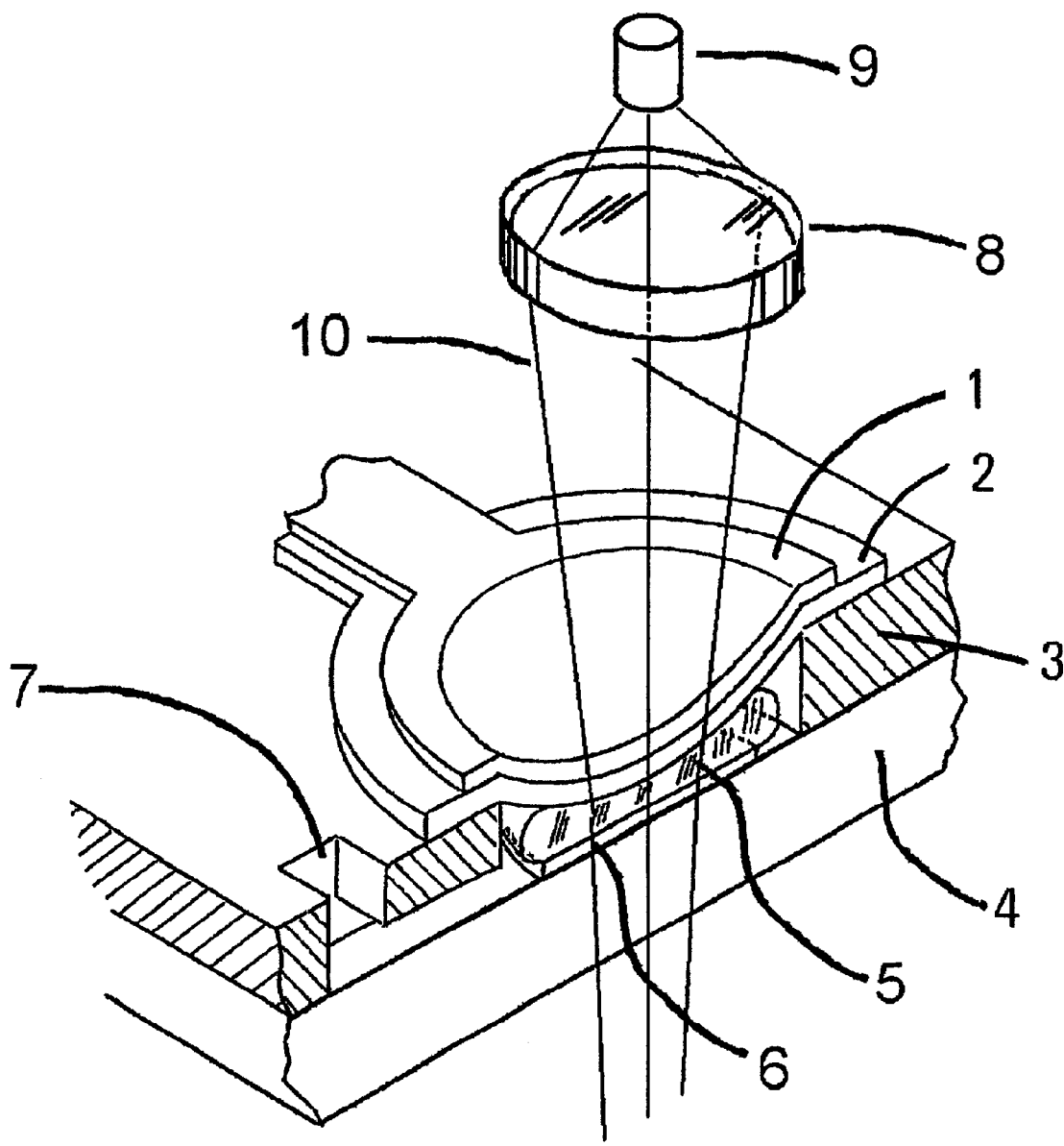
FIG. 1 shows a micro-electromechanical device in accordance with the present invention.

FIG. 1 illustrates a preferred embodiment of a micro-electromechanical (MEMS) adaptive lens in accordance with the present invention. In a practical application such as an optical crossbar switch, the complete switch may have an array of elements of the type depicted here. For the sake of clarity, FIG. 1 shows a single adaptive lens element.

Referring now to FIG. 1, flexible transparent electrode 1 is fashioned from a transparent and conductive material on top of flexible insulating layer 2. The two layers are fashioned over a circular "pillbox" cavity in frame 3 of the MEMS device. The portions of the two layers 1, 2 that are suspended over the cavity in frame 3 constitute a transparen "membrane" of the adaptive lens. Frame 3 represents a fixed member of the MEMS device depicted in FIG. 1. Frame 3 may be fashioned from silicon, poly-silicon, or a variety of other micro-machining-compatible materials, including silicon nitride.

In the preferred embodiment of the present invention, flexible transparent electrode 1 is composed of indium tin oxide, but in the general case the material used to form flexible transparent electrode 1 (which provides a transmitting function) may be selected to suit the light being transmitted. It is also possible to add additional transparent layers to electrode 1, for example, anti-reflection. layers can be added on top of transparent conductive layer 1.

In the general case, when using a multi-layer structure, one layer may be dedicated and optimized for the electrode function while another layer serves to optimize the optical transmission. Conversely, it is possible to make the entire transparent membrane from one material that has the optical, electrical, and elastic properties that are required.

Flexible insulating transparent layer 2 is fashioned such that its peripheral edges extend over frame 3. In the preferred embodiment of the present invention, it is preferred that the elastic properties of the membrane be provided by flexible insulating transparent layer 2 in the form of a silicon nitride layer, which is optically transmissive at the wavelengths of concern, and that the electrode function of the membrane be provided by an indium tin oxide layer constituting optically transparent conductive layer 1. This choice of material, is due in part to the fact that indium tin oxide has desirable transmissive properties and is conductive, while silicon nitride is well established as a preferred material for flexible structures in MEMS devices due to its desirable elastic properties.

The air space under flexible insulating transparent layer 2 may be created using a sacrificial layer micro-machining process. Sacrificial layer techniques are well established in the microelectronics and micro-electromechanical systems (MEMS) fields and will not be detailed herein. Transparent base electrode 6 may be fashioned from a transparent conductive material, such as indium tin oxide, on top of transparent base 4 by standard deposition processes. Glass is the material of choice for transparent base 4 in the preferred embodiment of the present invention, which is directed at operating wavelengths of 1550 nm. Silicon of the appropriate purity may be employed as material from which to form transparent base 4 for wavelengths greater than the band gap of silicon. In the general case, the material used to form transparent base 4 is required to be transparent at the wavelength range of choice.

By fashioning flexible insulating transparent layer 2 from an insulating material, such as silicon nitride, flexible insulating layer 2 ensures electrical isolation between electrode 1 and transparent base electrode 6 in those cases where the material employed for the transparent base 4 is conductive, such as will be the case for a base 4 made of silicon. The transparent membrane is therefore attached along its perimeter to the fixed member, frame 3. It is to be noted that the perimeter referred to here is that of the transparent membrane as a whole; that is, the outer sections of layers 1 and 2 that are suspended over the "pillbox" cavity in frame 3.

There are many variations on the generic processes for fabricating micro-machined devices, such as the adaptive lens described in this preferred embodiment. A detailed description of a representative variant of this kind of processing of MEMS devices is given by Bifano et al in Optical Engineering, Vol 36 (5), pp. 1354–1360 (May 1977).

Access hole 7 may be formed in frame 3 for two purposes. Firstly, it may serve as vent for trapped air when the transparent membrane of the device flexes, and secondly, it may be employed to inject a refractive liquid 5 into the space formed by the "pillbox" cavity in frame 3. In the preferred embodiment of the present invention, this refractive liquid 5 is preferably optical immersion oil. In general, the refractive liquid 5 is chosen to have a high refractive index, a low vapor pressure and as low a viscosity as possible. Optical immersion oil satisfies these requirements.

During fabrication, those surfaces of the device that fall inside the "pillbox" cavity of frame 3, including transparent base electrode 6, may be treated with an oleophobic material such as the low surface energy coatings employed as standard practice in MEMS fabrication to counter the well-known stiction problem. Since there is no preferential site for an injected oil droplet 5 on these oleophobic surfaces, the oil droplet 5 localizes itself in the middle of the "pillbox" cavity and fills the "pillbox" cavity to a degree determined by the droplet volume. The volume of refracted oil 5 selected in the preferred embodiment of the present invention, is such that the droplet 5 conforms with both the central portion of the transparent membrane and with the transparent base electrode 6.

The adaptive refractive function of the present invention is established by the combination of refractive liquid droplet 5, flexible insulating transparent layer 2, flexible transparent electrode 1, transparent base electrode 6, and transparent base 4. In this description, we refer to the combination of transparent base electrode 6 and the transparent base 4 as the "transparent flat". The refractive liquid droplet 5 therefore combines with the transparent membrane and the transparent flat to create an adaptive lens. The transparent membrane separates two refractive regions of differing refractive index. In the case of the preferred embodiment of the present invention, the two regions are air and optical immersion oil 5. In the general case, the two regions of differing refractive index can be made up of a wide selection of substances and it is generally possible to implement thin present invention with any fluid on one of the two sides of the membrane. In this description, the term "refractive region" is therefore used to describe any body of material, gas, liquid, or other substance with a refractive index, specifically including free space and vacuum.

It is evident that the processes described herein may be used to create alternative detailed embodiments of the current invention that allow fabrication by planar processing in which devices are fashioned within deposited layers, rather than etching the frame 3 of FIG. 1.

With no voltage applied between electrodes 1 and 6, light beam 10 from light source 9, collimated or focused by fixed focal length lens 8, impinges on the flat surface of the transparent membrane and is transmitted directly through the combination of refractive liquid droplet 5, flexible insulating transparent layer 2, flexible transparent electrode 1, transparent base electrode 5, and optically transparent base 4 without any focusing.

In FIG. 1, light beam 10 is shown to be focused by lens 8. Application of a voltage difference between electrodes 1 and 6 causes an electrostatic attractive force between the two electrodes 6 and 1. This is a standard actuating technique employed in many MEMS devices. In the case of the preferred embodiment of the present invention, as shown in FIG. 1, this electrostatic attractive force results in the transparent membrane deforming into the "pillbox" cavity of frame 3 in a substantially radially symmetrical fashion to form a concave surface. This deformation and the resultant concave surface are shown exaggerated in FIG. 1 for the sake of clarity.

This deformation causes light beam 6 to be refracted, and change focus as the adaptive lens device assumes the shape of a half-concave lens and acquires a distinct negative focal length that becomes shorter with increasing applied voltage. In the preferred embodiment of the present invention, as shown in FIG. 1, the negative focal length of the device has the effect of causing a divergence in light beam 10 in opposition to the convergent effect of fixed focal length lens 8. As the voltage is increased, the refractive divergence caused by the adaptive lens device increases.

Bifano et al, in FIG. 10 of Optical Engineering, Vol 36 (5), pp. 1354–1360 (May 1977), describe the variation of the membrane deformation with applied voltage in the absence of the refractive liquid droplet. It is evident from that work that the deformed membrane lends itself to good control at low applied voltages, which correlate to small deformations and low attenuation.

It is well known to practitioners in the field that layers such as flexible insulating transparent layer 2 and flexible transparent electrode 1 may be deposited with various degrees of pre-stress by an appropriate choice of micro-lithographic materials and processing conditions. In the preferred embodiment of the invention shown in FIG. 1 the flexible insulating transparent layer 2 and flexible transparent electrode 1 are preferably deposited in tension.

The purpose of this pre-stressing step is to obtain a radially symmetrical stress-field in the transparent membrane. This pre-stressing ensures that the transparent membrane is as flat as possible when no voltage is applied between electrodes 1 and 6. The flat surface of the transparent membrane in turn ensures that, at zero applied voltage, the device will transmit light beam 10 with a minimum possible change in direction.

Minimizing the change in the propagation direction of optical beam 10 at zero applied voltage is an important requirement for adaptive lenses that are to function at the low-end of the adaptation range. The pre-stressing also provides the device with better control over membrane displacement, particularly at low voltages and small displacements. It furthermore ensures a high natural resonance frequency, which allows the device to be employed in systems that require rapidly varying adaptation.

In the case of the present invention, the stressed circular transparent membrane has a distinctive and well-controllable elastic deformation. MEMS devices are well known to exhibit a so-called "snap-down" phenomenon. Snap down occurs in cantilever devices when the voltage applied to the device reaches a point at which the elastic restoring force of the cantilever is exceeded by the electrostatic attractive force and the cantilever physically snaps down onto the silicon substrate. The present invention, by virtue of the choice of circular membrane and pre-stressing, exhibits a deformation of the transparent membrane that is both radially symmetrical and much more controllable than cantilever devices. The choice of membrane materials, thickness and pre-stressing jointly determine the extant of deformation of the center of the membrane for a given applied voltage.

The elastic deformation of the transparent membrane is substantially concave in nature with the precise shape being determined by the diameter and elastic properties of the transparent membrane, the lateral extent of electrode 6, and the magnitude of the applied voltage.

A pre-stressed circular transparent membrane is particularly well suited for applications requiring low degrees of refraction. In such cases, the deformation of the transparent membrane is extremely small and yet has to be controlled.

MEMS cantilever devices inherently deform or curl due to deposition-induced stresses. It is exceedingly difficult to produce cantilever devices that are totally flat at zero applied voltage. Similarly, it is very difficult to impose a repeatable degree of curl on such a cantilever device with a view to having a repeatable zero-voltage curl.

In the case of devices that have deforming surfaces that are strapped down around their perimeters, but in which the deforming surface is not pre-stressed, there is also difficulty in assuring a repeatable situation at zero applied voltage. In keeping with the objects of the present invention, the deformable membrane is radially stressed in order to ensure a reproducible zero-voltage state for the device.

Another object of the invention is to ensure that optimal control over the deformation is obtained, particularly at small deformations. With devices that are not pre-stressed, the transparent membrane can assume a variety of deformations under the action of the voltage and the attenuation will therefore be difficult to control. By pre-stressing the membrane, the device is effectively being biased towards a flat orientation so as to achieve maximal optical throughput and minimum refractive effect at zero applied voltage.

By way of example, a silicon nitride membrane with a diameter of 1 mm, a thickness of less than one micron and an air gap of about 1.5 microns can be deflected about 1 micron with a voltage of below 100V. Such a membrane, together with a refractive liquid in the form of an oil with a refractive index of 1.5, will form, when deflected, a lens with a negative focal length of about 60 mm. The approximate formula for the focal length, f, is given by:

$$f=(n-1)\times(\text{membrane diameter})^2/(8\times\text{deflection})$$

where n is the refractive index of the liquid and is typically between 1.3 and 2.

When this adaptive lens is coupled with a fixed lens of focal length 60 mm, the focal length of the combination may be varied from 60 mm to infinity in a continuous and repeatable manner in a few milliseconds.

The above embodiments share the same inventive method comprising the use of a stressed transparent membrane, attached by its perimeter to a fixed frame, and actuated by electrostatic force to effect the controlled refraction of an input light beam transiting through the device.

In the more general case, the perimeter of the membrane need not be circular, but may be of any smoothly varying two-dimensional shape. This allows the membrane to be pre-stressed without inducing areas of excessive local stress, such as will occur at sharp corners. One particular alternative embodiment, in this respect, is a structure that is substantially rectangular with rounded corners and which will, near the center of its extent, behave as a cylindrical lens. Such elements are important for use with light sources that have differing divergence in perpendicular directions, such as side-emitting semiconductor lasers.

The device may be adjusted according to the light source used. In particular, the voltage on the device may be changed to compensate for the variation of refractive index with the wavelength of the source, thereby keeping focal lengths the same. The wavelength limitations involved pertain only to the choice of materials. This matter is in the hands of the designer of products embodying the invention and does not limit the invention itself in respect of wavelength.

No feedback is employed in the preferred embodiment of the present invention, as the addition of such a function adds to the complexity and cost of the device. However, feedback can be incorporated in an alternative embodiment of the present invention by a number of different means. These include capacitively measuring the membrane position or sampling the light going in and coming out and adjusting the applied voltage and consequent deformation based on this measurement.

The actuation of the membrane may be linearized or given any desirable transfer function. The term "linearization" is used in this description to describe any collection of steps or mechanisms that leads to the behavior of the device being mathematically described by a set of linear equations. One way in which this may be achieved is by means of lookup tables relating the input actuation and output deformation of the membrane. A linearization look-up table can be included in a semiconductor memory structure, which may be incorporated on the same contiguous piece of silicon wafer as the adaptive lens itself. In a co-pending United States patent application entitled "Method for linearization of an actuator via force gradient modification" (U.S. Ser. No. 09/813839) which is hereby incorporated by reference, this kind of mechanism is described in detail.

Figure 2:
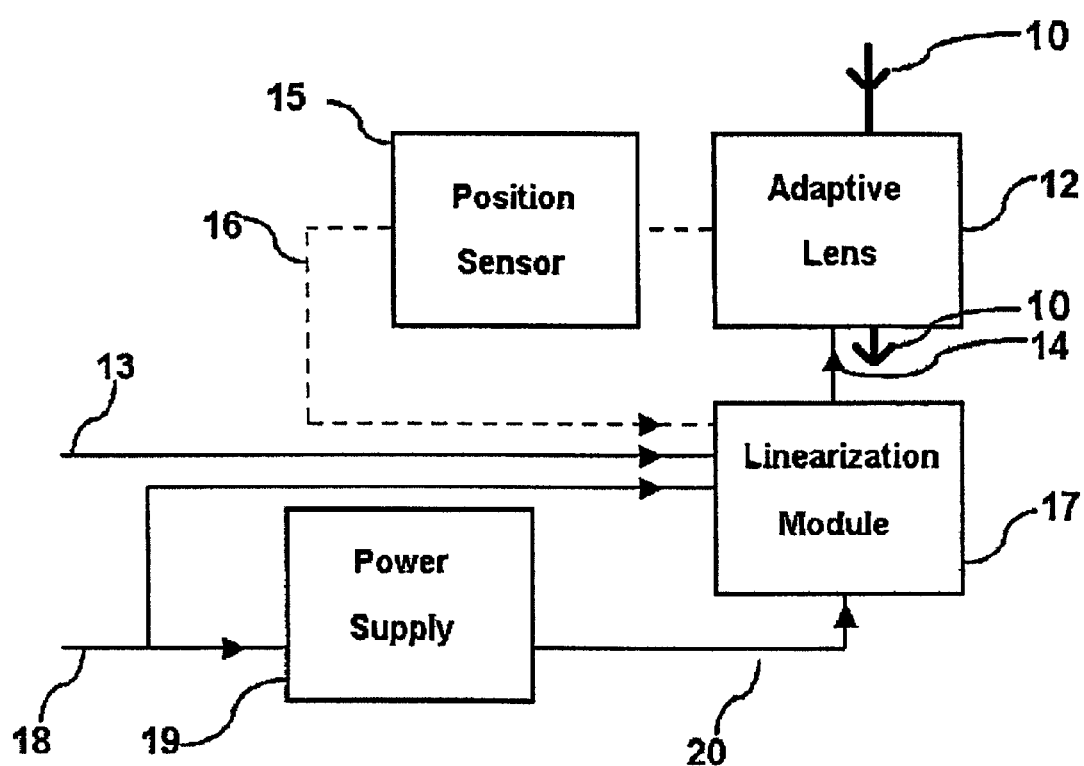
FIG. 2 shows a block diagram of the device in accordance with the present invention.

FIG. 2 shows a block diagram of such an alternative embodiment of the present invention in which the preferred embodiment shown in FIG. 1, is incorporated as adaptive lens 12, with impinging light beam 10. Adaptive lens 12 can also be controlled via control signal 13 which is adapted by linearization module 17 and provided to the adaptive lens 12 as actuation signal 14. The deformation of the membrane of adaptive lens 12 is sensed by position sensing means 15, which provides linearization module 17 with a feedback signal 16. Input power 18, typically 5 VDC, 12 VDC, or 48 VDC, is provided to the whole system and power supply 19 uses this energy source to provide the linearization module 17, and thereby adaptive lens 12, with a higher voltage 20, which may typically be between 50 and 100 V. Linearization module 17 generates the actuation signal 14 as a voltage, typically 0–100V. The linearization module can be of the analog type or, preferably, digital with a lookup-table and programmable with an arbitrary transfer function. Such methods are well known in the art. For greater long-term stability a feedback sensor 15 measures the actual position and/or performance of the adaptive lens 12 and further modifies the actuation signal 14.

FIG. 1 shows one adaptive lens element with an associated light source and collimating lens. This embodiment of the present invention may be repeated in two dimensions in a plane to create an array of adaptive lenses. It is possible to fabricate all of these devices on a single contiguous section of silicon wafer using standard MEMS technology as described and referred to above. In this way, it is possible to generate one or two-dimensional arrays of adaptive lenses for managing optical beams from a multiplicity of optical channels. Any or all of these may be implemented with the feedback and control mechanisms shown in FIG. 2 in order to ensure adequate control over the refraction process.

Figure 3:
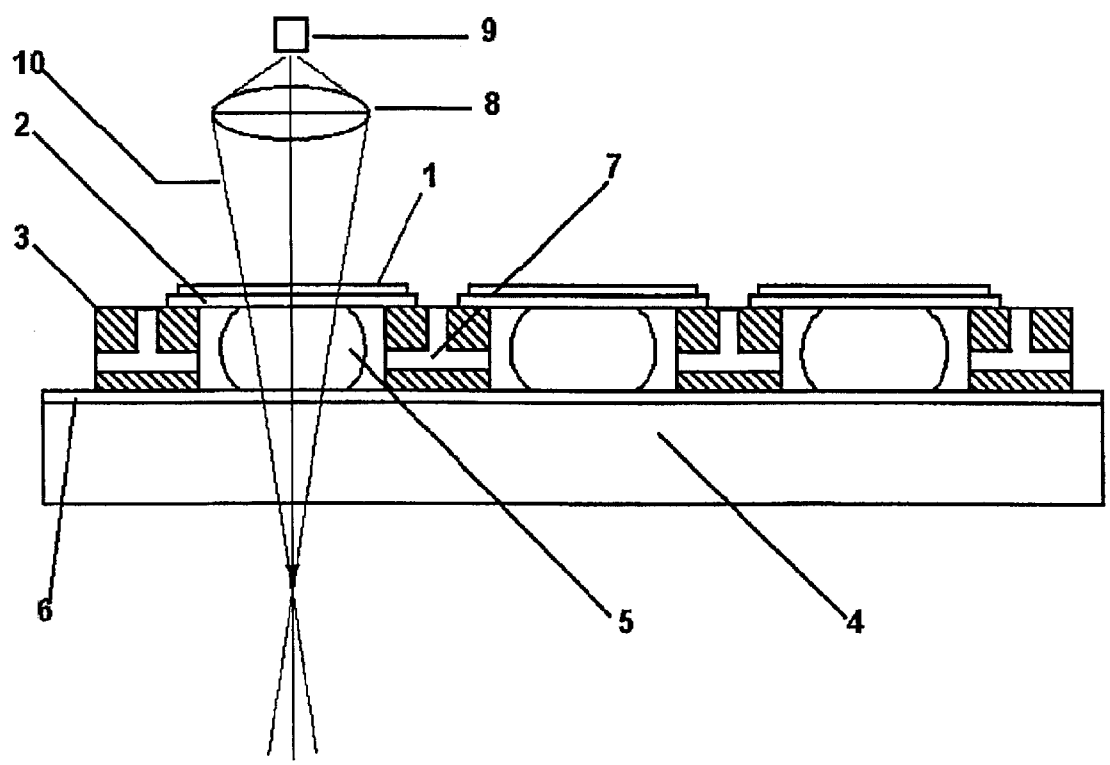
"FIG. 3 shows one possible embodiment for implementing an array of devices of the type shown in FIG. 1.
Figure 4:
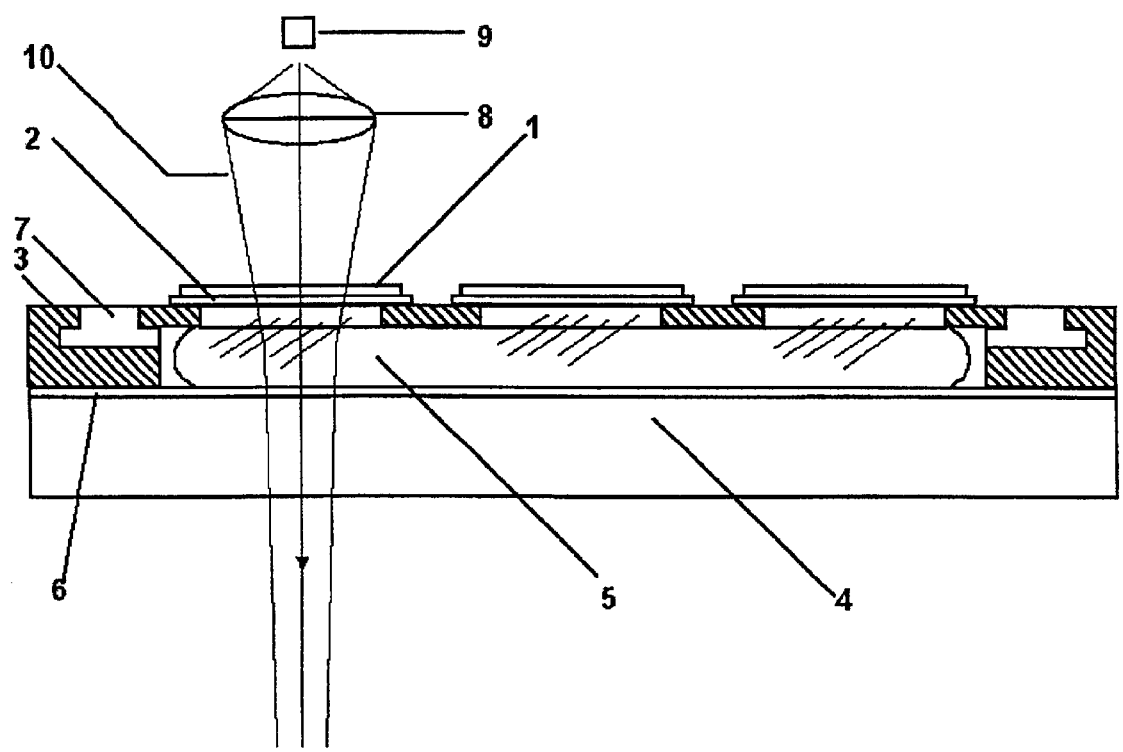
FIG. 4 shows another possible embodiment for implementing an array of devices of the type shown in FIG. 1."

A number of different ways exist to combine these individual adaptive elements. In FIG. 3 and FIG. 4, two ways are shown in which such elements may be combined. For the sake of clarity, FIG. 3 and FIG. 4 show arrays of adaptive devices in only one direction, but it will be clear to those skilled in the art, that the same principles may be applied to create two-dimensional arrays. In both cases the numbering of components, for the sake of clarity, is the same as in FIG. 1. In both FIG. 3 and FIG. 4, use is made of a communal transparent base electrode 6. In the case of the embodiment shown in FIG. 3, each element has its own refractive liquid droplet 5 in a dedicated "pillbox" structure, similar to FIG. 1. However, in the case of the embodiment shown in FIG. 4, all the elements in the array share a communal droplet of refractive liquid 5. The individual refractive lenses are formed by localized deformation of the droplet underneath a particular transparent membrane that is deformed by an applied voltage.

There has thus been outlined the important features of the invention in order that it may be better understood, and in order that the present contribution to the art may be better appreciated. Those skilled in the art will appreciate that the conception on which this disclosure is based may readily be utilized as a basis for the design of other apparatus for carrying out the several purposes of the invention. It is most important, therefore, that this disclosure be regarded as including such equivalent apparatus as do not depart from the spirit and scope of the invention.

What is claimed is:

1. A method for varying a direction of a light beam passing through a micro-machined device, said method comprising directing said light beam through a transparent membrane separating two refractive regions, each of said refractive regions comprising a fluid with a different refractive index, said membrane being attached at its perimeter to a fixed member; and, inducing a deformation of said membrane, thereby increasing a thickness of a first one of said refractive regions and correspondingly decreasing a thickness of a second one of said refractive regions.

2. A method as in claim 1, wherein said deformation is induced by electrostatic force.

3. A method as in claim 1, wherein at least one of said refractive regions comprises a refractive liquid.

4. A method as in claim 3, wherein said membrane is in tensile stress.

5. A method as in claim 4, wherein the perimeter of said membrane is substantially circular.

6. A method as in claim 4, wherein said membrane is one of a plurality of substantially identical membranes fabricated on one contiguous section of silicon wafer and each one of said plurality of membranes is capable of being deformed independently of any other one of said plurality of membranes.

7. A method as in claim 6, wherein more than one of said plurality of membranes are in contact with a single body of refractive liquid.

8. A method as in claim 3, wherein said tensile stress is induced during fabrication of said membrane.

9. A method as in claim 1, comprising controlling the direction of the light beam passing through the micro-machined device using a feedback method.

10. A method as in claim 9, wherein said feedback method comprises generating a signal indicative of one or more of: the direction of the light beam passing through the micro-machined device, an amount of said deformation, an amount of electrostatic force between said membrane and an electrode on said fixed member, and an amount of electrical capacitance between said membrane and said electrode.

11. A method as in claim 10, wherein said feedback method comprises linearization of the deformation of said membrane.

12. A method as in claim 11, wherein said linearization comprises using data from a look-up table.

13. A method as in claim 12, wherein said look-up tables are programmed into memory cells resident on the same piece of contiguous silicon as said membrane.

14. An adaptive lens in a micro-machined device, said adaptive lens comprising a deformable transparent membrane separating two refractive regions, each of said refractive regions comprising a fluid with a different refractive index, wherein an amount of deformation of said transparent membrane determines an amount of refraction caused to a light beam transmitted by said adaptive lens.

15. An adaptive lens as in claim 14, wherein deformation of said membrane is induced by electrostatic force.

16. An adaptive lens as in claim 14, wherein at least one of said refractive regions comprises a refractive liquid.

17. An adaptive lens as in claim 16, wherein said membrane is in tensile stress.

18. An adaptive lens as in claim 17, wherein said tensile stress is induced during fabrication of said membrane.

19. An adaptive lens as in claim 16, wherein said membrane is substantially circular.

20. An adaptive lens as in claim 14, wherein said deformable transparent membrane is one of a plurality of substantially identical membrane fabricated on one contiguous section of silicon wafer and each one of said plurality of membranes is capable of being deformed independently of any other one of said plurality of membranes.

21. An adaptive lens as in claim 20, wherein more than one of said plurality of membranes are in contact with a single body of refractive liquid.

22. An adaptive lens within a micro-machined device, said adaptive lens comprising of a transparent membrane attached at its perimeter to a fixed member and
   a. said membrane separating two refractive regions of differing refractive index, and
   b. said membrane being capable of changing its curvature in response to an electrical control signal, the degree of refraction of said adaptive lens being controlled by said curvature.

23. An adaptive lens as in claim 22, wherein at least one of said refractive regions comprises a refractive liquid.

24. An adaptive lens as in claim 23, wherein said membrane is in tensile stress.

25. An adaptive lens as in claim 22, wherein said membrane is one of a plurality of substantially identical membranes fabricated on one contiguous section of silicon wafer, said membrane being capable of being deformed independently of any other one of said multiplicity of membranes.

26. An adaptive lens as in claim 25, wherein more than one of said plurality of substantially identical membranes are in contact with the same body of refractive liquid.

27. An adaptive lens as in claim 22 wherein said degree of refraction is controlled via a feedback mechanism.

28. An adaptive lens as in claim 27, wherein said feedback mechanism comprises a feedback sensor, which indicates one or more of: said degree of refraction, an amount of said curvature, an amount of electrostatic force between said membrane and an electrode on said fixed member, and an amount of electrical capacitance between said membrane and said electrode.

29. An adaptive lens as in claim 28 wherein said feedback mechanism comprises a linearization means to linearize said adaptive lens.

30. An adaptive lens as in claim 29 wherein said linearization means comprises look-up tables.

31. An adaptive lens as in claim 30 wherein said look-up tables are programmed into memory cells resident on the same piece of contiguous silicon as said adaptive lens.

32. A micro-electromechanical adaptive lens comprising a deformable transparent membrane attached at its perimeter to a substrate, wherein an amount of deformation of the membrane determines an amount of refraction of a light beam transmitted through the adaptive lens, wherein the membrane extends over a cavity in the substrate and, when deformed, the membrane curves into the cavity.

33. An adaptive lens according to claim 32, wherein the membrane separates a first region and a second region, each of the first and second regions comprising fluid with a different refractive index.

34. An adaptive lens according to claim 32, wherein the cavity contains a liquid which has a refractive index different than that of a fluid on an opposing side of the membrane.

35. An adaptive lens according to claim 32 comprising an electrode located in a vicinity of the membrane, wherein the amount of deformation of the membrane is dependent on a magnitude of an electric field applied between the electrode and the membrane.

36. An adaptive lens according to claim 35, wherein the electrode is located inside the cavity.

37. An adaptive lens according to claim 36, wherein the electrode is substantially transparent.

38. An adaptive lens according to claim 35, wherein the membrane comprises a conductive layer and an insulating layer.

39. An adaptive lens according to claim 38, wherein the insulating layer is located between the electrode and the conductive layer.

40. An adaptive lens according to claim 35, wherein, when the magnitude of the electric field is zero, the membrane is substantially flat.

41. An adaptive lens according to claim 35, comprising a feedback unit, wherein the feedback unit is connected to receive a control signal indicative of a desired amount of refraction and at least one of: a measured value of the amount of refraction; a measured value of the amount of deformation; a measured value of the size of the electric fields; and, a measured value of an amount of capacitance between the membrane and the electrode; and wherein the feedback unit is connected to output a signal that controls the magnitude of the electric field, to produce the desired amount of refraction.

42. An adaptive lens according to claim 41, wherein the feedback unit comprises a linearization module having at least one look-up table stored in a memory.

43. An adaptive lens according to claim 42, wherein the memory comprises memory cells on the substrate.

44. A micro-electromechanical adaptive lens comprising a deformable transparent membrane attached at its perimeter to a substrate, wherein an amount of deformation of the membrane determines an amount of refraction of a light beam transmitted through the adaptive lens, wherein the membrane is under tensile stress.

45. An adaptive lens according to claim 44, wherein the tensile stress is induced during fabrication of the membrane.

46. A micro-electromechanical adaptive lens comprising a deformable transparent membrane attached at its perimeter to a substrate, wherein an amount of deformation of the membrane determines an amount of refraction of a light beam transmitted through the adaptive lens, wherein the perimeter of the membrane is substantially circular.

47. A plurality of substantially similar micro-electromechanical adaptive lenses each comprising a deformable transparent membrane attached at its perimeter to a substrate, wherein an amount of deformation of the membrane determines an amount of refraction of a light beam transmitted through the adaptive lens, each one of the adaptive lenses fabricated in a single substrate and comprising an independently deformable transparent membrane.

48. A plurality of adaptive lenses according to claim 47, wherein the independently deformable transparent membranes extend ever a single cavity in the substrate and, when deformed, each membrane curves into the cavity.

49. A plurality of adaptive lenses according to claim 48, wherein the cavity contains a body of refractive liquid and each membrane is in contact with the body of refractive liquid.

50. A micro-electromechanical adaptive lens comprising a deformable transparent membrane attached at its perimeter to a substrate, wherein an amount of deformation of the membrane determines an amount of refraction of a light beam transmitted through the adaptive lens, wherein the membrane separates a first region and a second region, each of the first and second regions comprising a fluid having a different refractive index.

51. A micro-electromechanical adaptive lens comprising a deformable transparent membrane attached at its perimeter to a substrate, wherein an amount of deformation of the membrane determines an amount of refraction of a light beam transmitted through the adaptive lens, comprising an electrode located in a vicinity of the membrane, wherein the amount of deformation of the membrane is determined by an electric field applied between the electrode and the membrane.

52. A method for varying an amount of refraction of a light beam transmitted by a micro-electromechanical adaptive lens, the method comprising:
providing a deformable transparent membrane, attached at its perimeter to a substrate; and
inducing a deformation of the membrane, wherein an amount of the deformation of the membrane determines the amount of refraction of the light beam transmitted by the adaptive lens, wherein inducing a deformation of the membrane comprises curving the membrane into a cavity formed in the substrate.

53. A method according to claim 52, wherein the membrane separates a first region and a second region, each of which comprises a fluid with a different refractive index, and wherein deforming the membrane comprises decreasing a thickness of the second region.

54. A method according to claim 53, wherein the second region comprises a refractive liquid.

55. A method according to claim 52, wherein inducing a deformation of the membrane comprises applying an electrostatic force to the membrane.

56. A method according to claim 55, wherein the amount of deformation of the membrane is dependent on a magnitude of the electrostatic force.

57. A method according to claim 56, wherein, when the magnitude of the electrostatic force is zero, the membrane is substantially flat.

58. A method according to claim 56 comprising controlling the amount of refraction of the light beam by:
receiving a control signal indicative of a desired amount of refraction;
measuring at least one measured value from among: the amount of refraction; the amount of deformation; the magnitude of the electrostatic force; and a capacitance associated with the electrostatic force;
generating an output signal that determines the magnitude of the electric field to produce the desired amount of refraction based on the control signal and the at least one measured value.

59. A method according to claim 58 comprising linearizing the deformation of the membrane.

60. A method for varying an amount of refraction of a light beam transmitted by a micro-electromechanical adaptive lens, the method comprising:
providing a deformable transparent membrane, attached at its perimeter to a substrate; and
inducing a deformation of the membrane, wherein an amount of the deformation of the membrane determines the amount of refraction of the light beam transmitted by the adaptive lens, comprising maintaining the membrane under tensile stress.

61. A method for varying an amount of refraction of a light beam transmitted by a micro-electromechanical adaptive lens, the method comprising:
providing a deformable transparent membrane, attached at its perimeter to a substrate; and
inducing a deformation of the membrane, wherein an amount of the deformation of the membrane determines the amount of refraction of the light beam transmitted by the adaptive lens, wherein the membrane separates a first region and a second region, each of which comprises a fluid with a different refractive index, and wherein deforming the membrane comprises decreasing a thickness of the second region.

62. A method for varying an amount of refraction of a light beam transmitted by a micro-electromechanical adaptive lens, the method comprising:
providing a deformable transparent membrane, attached at its perimeter to a substrate; and
inducing a deformation of the membrane, wherein an amount of the deformation of the membrane determine the amount of refraction of the light beam transmitted by the adaptive lens, wherein inducing a deformation of the membrane comprises applying an electrostatic force to the membrane.

63. An adaptive lens comprising a deformable transparent membrane spaced apart from a transparent base and a transparent liquid having an index of refraction different from that of a fluid on a side of the membrane away from the base, the liquid located between the membrane and the base.

* * * * *